US011499939B2

(12) United States Patent
Tsujiya et al.

(10) Patent No.: US 11,499,939 B2
(45) Date of Patent: Nov. 15, 2022

(54) ULTRASONIC WAVE TRANSMITTER, PROPAGATION TIME MEASUREMENT DEVICE, GAS CONCENTRATION MEASUREMENT DEVICE, PROPAGATION TIME MEASUREMENT PROGRAM, AND PROPAGATION TIME MEASUREMENT METHOD

(71) Applicants: UEDA JAPAN RADIO CO., LTD., Ueda (JP); JAPAN RADIO CO., LTD., Tokyo (JP); NISSHINBO HOLDINGS INC., Tokyo (JP)

(72) Inventors: Kouichi Tsujiya, Ueda (JP); Yoshifumi Shinfuku, Tokyo (JP); Yasuhiro Toriyama, Tokyo (JP)

(73) Assignees: Ueda Japan Radio Co., Ltd., Ueda (JP); Japan Radio Co., Ltd., Tokyo (JP); Nisshinbo Holdings Inc., Tokyo (JP)

( * ) Notice: Subject to any disclaimer, the term of this patent is extended or adjusted under 35 U.S.C. 154(b) by 305 days.

(21) Appl. No.: 16/651,409

(22) PCT Filed: Sep. 28, 2018

(86) PCT No.: PCT/JP2018/036245
§ 371 (c)(1),
(2) Date: Mar. 27, 2020

(87) PCT Pub. No.: WO2019/069803
PCT Pub. Date: Apr. 11, 2019

(65) Prior Publication Data
US 2020/0292492 A1 Sep. 17, 2020

(30) Foreign Application Priority Data
Oct. 4, 2017 (JP) .............................. JP2017-194478

(51) Int. Cl.
*G01M 3/24* (2006.01)
*G01N 29/44* (2006.01)
*G01N 27/416* (2006.01)

(52) U.S. Cl.
CPC .......... *G01N 27/4162* (2013.01); *G01M 3/24* (2013.01); *G01N 29/44* (2013.01)

(58) Field of Classification Search
CPC .... G01N 29/024; G01N 29/44; G01N 29/346; G01N 29/326; G01N 27/4162;
(Continued)

(56) References Cited

U.S. PATENT DOCUMENTS 4,800,757 A  1/1989 Hashinoki et al.
5,060,514 A  10/1991 Aylsworth
(Continued)

FOREIGN PATENT DOCUMENTS

CN  1342262 A  3/2002
CN  1455865 A  11/2003
(Continued)

OTHER PUBLICATIONS

An accurate air temperature measurement system based on an envelope pulsed ultrasonic time-of-flight technique Y. S. Huang and Y. P. Huang et al., Department of Electrical Engineering. National Cheng-Kung University (Year: 2007).*
(Continued)

*Primary Examiner* — Jacques M Saint Surin
(74) *Attorney, Agent, or Firm* — Jason H. Vick; Sheridan Ross, PC

(57) ABSTRACT

A gas concentration measurement device comprises: a transmission circuit and a transmission oscillator for transmitting first ultrasonic waves in a concentration measurement space and transmitting second ultrasonic waves, which continue temporally from the first ultrasonic waves in the concentra-
(Continued)

tion measurement space; a reception oscillator and a reception circuit for receiving the ultrasonic waves that have propagated through the concentration measurement space; and a propagation time measurement unit for determining, on the basis of the times at which the first ultrasonic waves and the second ultrasonic waves were transmitted and the times at which the first ultrasonic waves and the second ultrasonic waves were received, the time in which ultrasonic waves propagate through the concentration measurement space. The second ultrasonic waves have an opposite phase with respect to that of the first ultrasonic waves, and the amplitude of the second ultrasonic waves is greater than that of the first ultrasonic waves.

13 Claims, 6 Drawing Sheets

(58) Field of Classification Search
CPC ............... G01N 29/343; G01N 29/341; G01N 2291/02809; G01N 2291/103; G01N 2291/021; G01M 3/24
USPC .......................................................... 73/23.2
See application file for complete search history.

(56) References Cited

U.S. PATENT DOCUMENTS

| | | | | |
|---|---|---|---|---|
| 5,130,950 | A * | 7/1992 | Orban .................... | G01B 17/06 |
| | | | | 73/152.58 |
| 5,313,820 | A | 5/1994 | Aylsworth | |
| 5,349,859 | A * | 9/1994 | Kleppe ................ | G01N 29/024 |
| | | | | 374/119 |
| 5,354,956 | A * | 10/1994 | Orban .................. | B06B 1/0681 |
| | | | | 181/105 |
| 5,369,979 | A | 12/1994 | Aylsworth | |
| 5,452,621 | A | 9/1995 | Aylesworth et al. | |
| 5,705,750 | A | 1/1998 | Mizukami et al. | |
| 6,308,572 | B1 | 10/2001 | Ishikawa et al. | |
| 6,418,782 | B1 | 7/2002 | Sato et al. | |
| 6,842,716 | B1 | 1/2005 | Lelei | |
| 6,886,412 | B2 * | 5/2005 | Banno .................. | G01N 29/024 |
| | | | | 73/24.01 |
| 7,096,719 | B2 * | 8/2006 | Gysling ............... | G01N 29/348 |
| | | | | 73/61.49 |
| 7,389,187 | B2 * | 6/2008 | Kersey ................ | G01N 29/024 |
| | | | | 702/45 |
| 8,047,082 | B2 * | 11/2011 | Bierl ..................... | G01F 15/043 |
| | | | | 73/861.04 |
| 11,054,397 | B2 * | 7/2021 | Tsujiya ................ | G01N 29/024 |
| 2002/0062681 | A1 | 5/2002 | Livingston | |
| 2003/0136193 | A1 | 7/2003 | Fujimoto | |
| 2004/0102700 | A1 | 5/2004 | Asafusa | |
| 2005/0072248 | A1 | 4/2005 | Suginouchi et al. | |
| 2007/0084286 | A1 | 4/2007 | Ajay et al. | |
| 2007/0286626 | A1 | 12/2007 | Du et al. | |
| 2013/0013227 | A1 | 1/2013 | Ajay et al. | |
| 2015/0128722 | A1 | 5/2015 | Ajay et al. | |
| 2017/0115255 | A1 * | 4/2017 | Sathyanarayana ..... | G01N 29/50 |

FOREIGN PATENT DOCUMENTS

| | | | |
|---|---|---|---|
| CN | 1714279 | A | 12/2005 |
| CN | 1777791 | A | 5/2006 |
| CN | 101672693 | A | 3/2010 |
| CN | 102297712 | A | 12/2011 |
| CN | 102866261 | A | 1/2013 |
| CN | 102914589 | A | 2/2013 |
| CN | 103185744 | A | 7/2013 |
| CN | 104897779 | A | 9/2015 |
| CN | 107024250 | A | 8/2017 |
| EP | 1020723 | A2 | 7/2000 |
| EP | 2278567 | A2 | 1/2011 |
| JP | H3-223669 | A | 10/1991 |
| JP | H8-254454 | A | 10/1996 |
| JP | H9-61523 | A | 3/1997 |
| JP | H9-127244 | A | 5/1997 |
| JP | H9-184716 | A | 7/1997 |
| JP | 2000-213971 | A | 8/2000 |
| JP | 2000-249691 | A | 9/2000 |
| JP | 2002-131427 | A | 5/2002 |
| JP | 2002-214203 | A | 7/2002 |
| JP | 2007-187506 | A | 7/2007 |
| WO | WO 2004/102499 | A1 | 11/2004 |
| WO | WO-2017099852 | A1 * | 6/2017 ............... G01F 1/66 |
| WO | WO-2018002612 | A1 * | 1/2018 ............... G01H 5/00 |

OTHER PUBLICATIONS

International Preliminary Report for International Application No. PCT/JP2018/036245, dated Apr. 16, 2020.
Notice of Reasons for Refusal (Including Translation) for corresponding Japanese Patent Application No. 2017-194478, dated Jun. 22, 2021.
Huang, Y.S., et al. "An Accurate Air Temperature Measurement System Based on an Envelope Pulsed Ultrasonic Time-of-Flight Technique" Review of Scientific Instrument 78, 115102; American Institute of Physics; 2007.
European Search Report for corresponding European Application No. 18864736.6, dated Nov. 24, 2020.
International Search Report for International Application No. PCT/JP2018/036245, dated Dec. 11, 2018.
Written Opinion for International Application No. PCT/JP2018/036245, dated Dec. 11, 2018.
First Office Action (Including Translation) for corresponding Chinese Patent Application No. 201880064222.6, dated Feb. 10, 2022.
He Qing, Zhang et al. "A Device for Measuring Propagation Time of Ultrasonic Wave" Process Automation Instrumentation, vol. 27, No. 3, Mar. 3, 2006.

* cited by examiner

ULTRASONIC WAVE TRANSMITTER, PROPAGATION TIME MEASUREMENT DEVICE, GAS CONCENTRATION MEASUREMENT DEVICE, PROPAGATION TIME MEASUREMENT PROGRAM, AND PROPAGATION TIME MEASUREMENT METHOD

CROSS REFERENCE TO RELATED APPLICATIONS

This application is a National Phase Application under 35 U.S.C. 371 of PCT Application No. PCT/JP2018/036245 having an international filing date of 28 Sep. 2018 which designated the United States, which PCT application claimed the benefit of Japanese Patent Application No. 2017-194478 filed 4 Oct. 2017, each of which are incorporated herein by reference in their entirety.

TECHNICAL FIELD

The present invention relates to an ultrasonic transmitter, a propagation time measurement device, a gas concentration measurement device, a propagation time measurement program, and a propagation time measurement method, and more particularly to a technique for obtaining a time required for ultrasonic waves to propagate in a measurement space.

BACKGROUND

Research and development have been broadly conducted on fuel cell vehicles traveling with electric power to be supplied from a fuel cell. The fuel cell generates electric power through a chemical reaction between hydrogen and oxygen. Typically, hydrogen is supplied as fuel to the fuel cell, and oxygen is taken into the fuel cell from ambient air. The fuel cell vehicles are equipped with a hydrogen tank, and hydrogen is supplied from the hydrogen tank to the fuel cell. When the amount of hydrogen within the hydrogen tank becomes smaller, hydrogen is supplied to the hydrogen tank in the fuel cell vehicle from a hydrogen supply device installed at a service station.

Since hydrogen is a flammable gas, it is necessary to monitor leakage of hydrogen from the fuel cell vehicle and the hydrogen supply device. Therefore, a hydrogen concentration measurement device has been widely used together with the fuel cell vehicle and the hydrogen supply device. The hydrogen concentration measurement device has a function of measuring a concentration of hydrogen contained in air and issuing an alarm when the concentration of hydrogen exceeds a predetermined value.

The following Patent literatures 1 and 2 disclose devices for measuring a concentration of a specified gas. The devices disclosed in the patent literatures measure the concentration of the specified gas based on propagation characteristics of ultrasonic waves, such as a propagation speed of the ultrasonic waves in air to be measured, and may be used for measuring the concentration of hydrogen. In addition, Patent Literatures 3 to 6 disclose techniques, as a technique related to the present invention, for specifying a time at which an ultrasonic pulse is received, based on waveforms of the ultrasonic pulse.

CITATION LIST

Patent Literature

Patent Literature 1: JP 2002-214203 A
Patent Literature 2: JP Hei3-223669 A
Patent Literature 3: JP Hei8-254454 A
Patent Literature 4: JP Hei9-127244 A
Patent Literature 5: JP Hei9-184716 A
Patent Literature 6: JP 2007-187506 A

SUMMARY

Technical Problem

In general, a device for measuring a concentration of a specified gas based on a propagation speed of ultrasonic waves includes a space where the concentration of the gas is measured. In such a concentration measurement space, ultrasonic transducers for transmitting and receiving ultrasonic waves are provided. The propagation speed of the ultrasonic waves is obtained based on the propagation time until the ultrasonic waves propagating in the concentration measurement space are received by the ultrasonic transducer for reception after the ultrasonic waves are transmitted from the ultrasonic transducer for transmission, and the propagation distance obtained in advance.

However, when the time waveforms of the ultrasonic pulse received by the ultrasonic transducer for reception are time waveforms not having characteristics such as a constant amplitude, it is difficult to detect the time at which the ultrasonic pulse is received. In this case, the measurement accuracy of the propagation time of the ultrasonic waves propagating in the concentration measurement space may be reduced, and the measurement accuracy of the gas concentration may be reduced.

It is an advantage of the present invention to improve measurement accuracy of a propagation time of ultrasonic waves.

Solution to Problem

The present invention is to provide an ultrasonic transmitter mounted on a propagation time measurement device, the propagation time measurement device being a device that transmits ultrasonic waves to a measurement space, and obtains a time required for the ultrasonic waves to propagate in the measurement space based on a time at which the ultrasonic waves are transmitted and a time at which the ultrasonic waves propagating in the measurement space are received, the ultrasonic transmitter including a transmission unit that transmits first ultrasonic waves to the measurement space and transmits second ultrasonic waves temporally following the first ultrasonic waves to the measurement space, wherein the second ultrasonic waves have an antiphase with respect to the first ultrasonic waves.

Preferably, the second ultrasonic waves have an amplitude larger than an amplitude of the first ultrasonic waves.

In addition, the present invention is to provide a propagation time measurement device includes: a transmission unit that transmits first ultrasonic waves to a measurement space and transmits second ultrasonic waves temporally following the first ultrasonic waves to the measurement space; a reception unit that receives ultrasonic waves propagating in the measurement space; and a propagation time measurement unit that obtains a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit, wherein the second ultrasonic waves have an antiphase with respect to the first ultrasonic waves.

Preferably, the second ultrasonic waves have an amplitude larger than an amplitude of the first ultrasonic waves.

Preferably, the propagation time measurement unit acquires a reception signal output from the reception unit based on the ultrasonic waves received by the reception unit, detects a boundary point formed on a time waveform of the reception signal depending on components of the first ultrasonic waves contained in the reception signal and components of the second ultrasonic waves contained in the reception signal, and obtains the time required for the ultrasonic waves to propagate in the measurement space based on a time of the boundary point.

Preferably, a concentration measurement unit is provided to measure a concentration of a specific gas in the measurement space, based on the time required for the ultrasonic waves to propagate in the measurement space.

In addition, the present invention is to provide a propagation time measurement program to be read by a propagation time measurement instrument, the propagation time measurement instrument including: a transmission unit that transmits ultrasonic waves to a measurement space; a reception unit that receives ultrasonic waves propagating in the measurement space; and a propagation time measurement unit that controls the transmission unit to transmit the ultrasonic waves to the transmission unit, and obtains a time required for the ultrasonic waves to propagate in the measurement space based on a time at which the ultrasonic waves are transmitted from the transmission unit and a time at which the ultrasonic waves are received by the reception unit, the propagation time measurement program causing propagation time measurement instrument to execute steps of: causing the transmission unit to execute a transmission process of transmitting first ultrasonic waves to a measurement space and transmitting second ultrasonic waves temporally following the first ultrasonic waves to the measurement space, the second ultrasonic waves having an antiphase with respect to the first ultrasonic waves; and obtaining a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit.

Preferably, the step of obtaining the time required for the ultrasonic waves to propagate in the measurement space includes a step of: acquiring a reception signal output from the reception unit based on the ultrasonic waves received by the reception unit, detecting a boundary point formed on a time waveform of the reception signal depending on components of the first ultrasonic waves contained in the reception signal and components of the second ultrasonic waves contained in the reception signal, and obtaining the time required for the ultrasonic waves to propagate in the measurement space based on a time of the boundary point.

In addition, the present invention is to provide a propagation time measurement method to be executed by a propagation time measurement instrument, the propagation time measurement instrument including: a transmission unit that transmits ultrasonic waves to a measurement space; a reception unit that receives ultrasonic waves propagating in the measurement space; and a propagation time measurement unit that controls the transmission unit to transmit the ultrasonic waves to the transmission unit, and obtains a time required for the ultrasonic waves to propagate in the measurement space based on a time at which the ultrasonic waves are transmitted from the transmission unit and a time at which the ultrasonic waves are received by the reception unit, the propagation time measurement method including causing the transmission unit to execute a transmission process of transmitting first ultrasonic waves to a measurement space and transmitting second ultrasonic waves temporally following the first ultrasonic waves to the measurement space, the second ultrasonic waves having an antiphase with respect to the first ultrasonic waves; and obtaining, using the propagation time measurement instrument, a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit.

Preferably, the obtaining of the time required for the ultrasonic waves to propagate in the measurement space includes: acquiring a reception signal output from the reception unit based on the ultrasonic waves received by the reception unit, detecting a boundary point formed on a time waveform of the reception signal depending on components of the first ultrasonic waves contained in the reception signal and components of the second ultrasonic waves contained in the reception signal, and obtaining the time required for the ultrasonic waves to propagate in the measurement space based on a time of the boundary point.

Advantageous Effects of Invention

According to the present invention, it is possible to improve measurement accuracy of a propagation time of ultrasonic waves.

DESCRIPTION OF EMBODIMENTS

Figure 1:
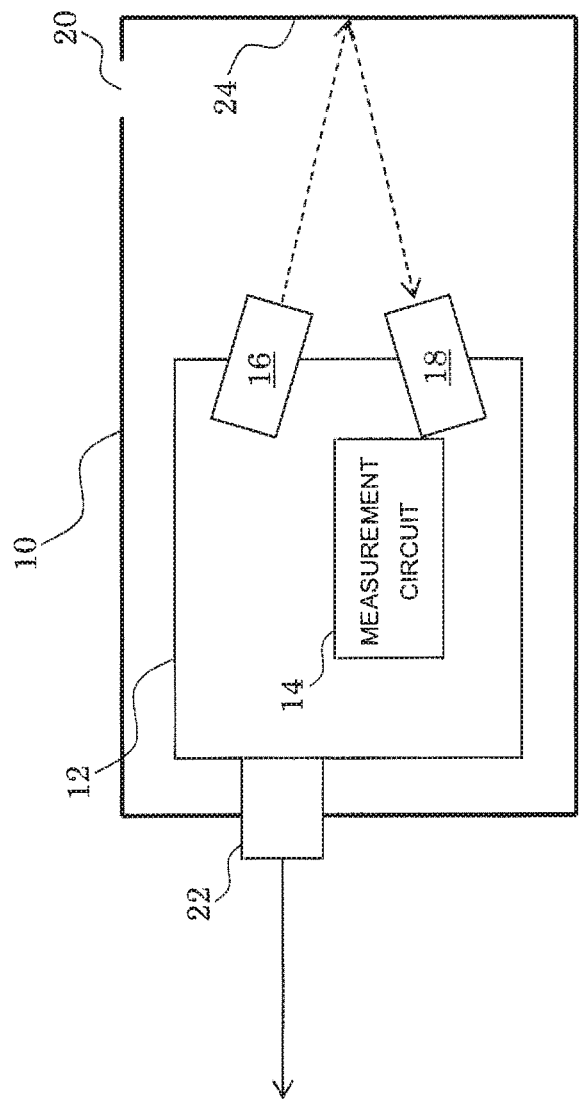
FIG. 1 is a diagram schematically illustrating a gas concentration measurement device.

FIG. 1 schematically illustrates a gas concentration measurement device according to an embodiment of the present invention. The gas concentration measurement device includes a housing 10 having a space in which a gas concentration is measured, and measures the gas concentration based on a propagation speed of ultrasonic waves propagating through a gas in the housing 10. The housing 10 is provided with a vent hole 20, and the gas circulates inside and outside the housing 10 through the vent hole 20. A shape of the concentration measurement space in the housing 10 is, for example, a rectangular parallelepiped shape or a cylindrical shape. The concentration measurement space does not necessarily have to be surrounded in all directions by a wall of the housing 10, and may be at least a space in which ultrasonic waves can be transmitted and received.

The gas concentration measurement device includes a circuit board 12 housed in the housing 10. On the circuit board 12, a measurement circuit 14, a transmission transducer 16, a reception transducer 18, and a connector 22 are mounted. The transmission transducer 16 transmits ultrasonic waves based on an operation of the measurement circuit 14. The reception transducer 18 is transmitted from the transmission transducer 16 and receives the ultrasonic waves reflected by a reflecting surface 24 on an inner surface of the housing 10. The measurement circuit 14 obtains a propagation speed of the ultrasonic waves based on a time until when the ultrasonic waves are received after being transmitted and a propagation distance of the ultrasonic waves stored in advance. The measurement circuit 14 measures a temperature inside the housing 10 based on a value detected by a temperature sensor provided therein, and further obtains a gas concentration based on the propagation speed of the ultrasonic waves and the measured temperature value. The measurement circuit 14 outputs the gas concentration measurement value to, for example, a computer and a display device which are external devices and are connected to the connector 22.

Figure 2:
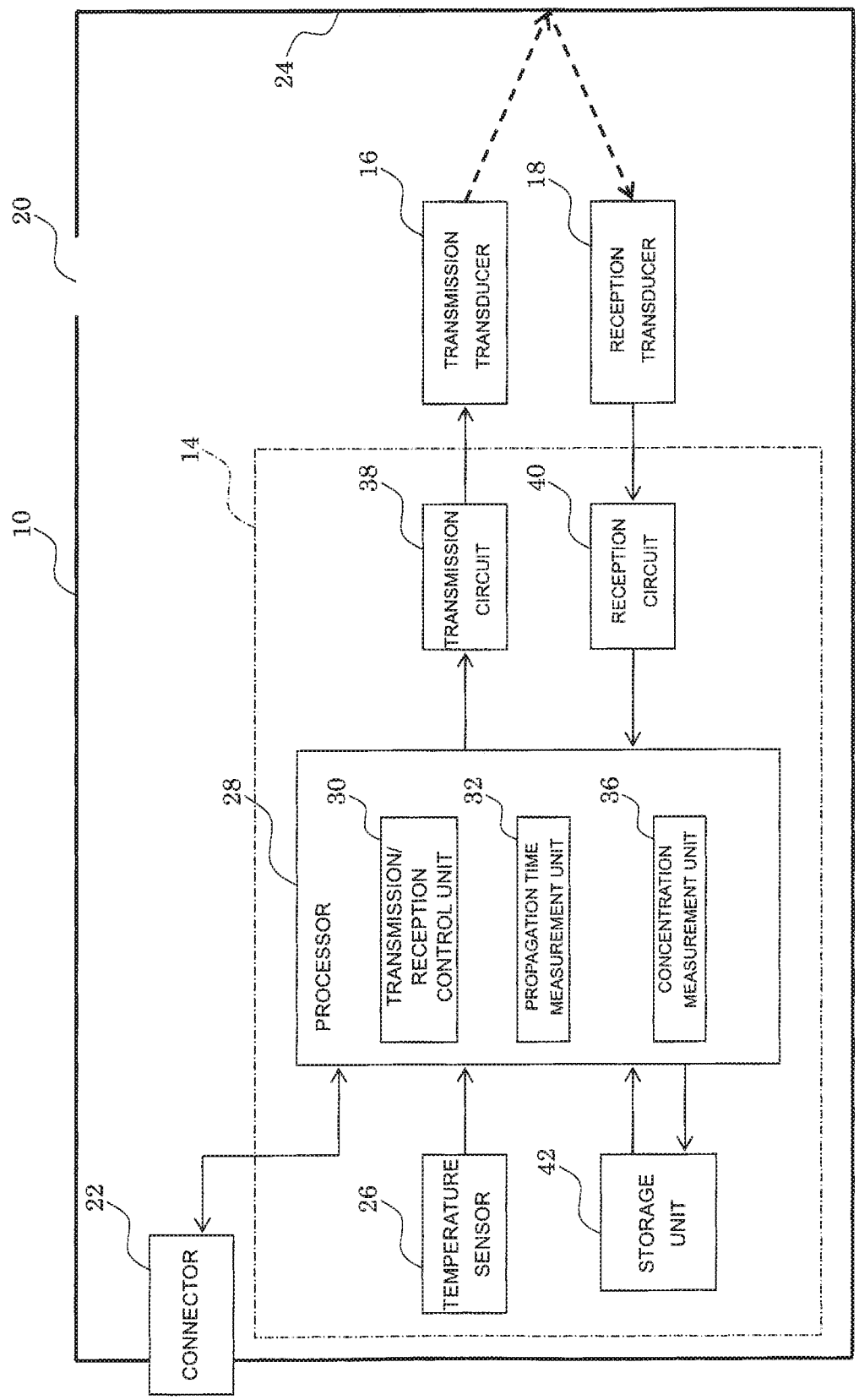
FIG. 2 is a diagram illustrating a detailed configuration of the gas concentration measurement device.

FIG. 2 illustrates a detailed configuration of the gas concentration measurement device according to the embodiment of the present invention. The gas concentration measurement device includes the housing 10, the transmission transducer 16, the reception transducer 18, the measurement circuit 14, and the connector 22. The measurement circuit 14 includes a transmission circuit 38, a reception circuit 40, a processor 28, and a storage unit 42. The transmission transducer 16, the reception transducer 18, and the connector 22 are connected to the measurement circuit 14.

The processor 28 executes a program stored therein in advance, or a program stored in the storage unit 42, and thus includes a transmission/reception control unit 30, a propagation time measurement unit 32, and a concentration measurement unit 36. These components may be individually configured by digital circuits, which is hardware, instead of being realized by the processor 28.

A description will be given with respect to a process in which the gas concentration measurement device measures a hydrogen concentration. The transmission circuit 38 and the transmission transducer 16 operate as a transmission unit that transmits ultrasonic waves. The transmission circuit 38 outputs a transmission pulse signal to the transmission transducer 16 under control of the transmission/reception control unit 30. The transmission transducer 16 converts the transmission pulse signal, which is an electric signal, into ultrasonic waves, and transmits an ultrasonic transmission pulse. The ultrasonic transmission pulse is reflected by the reflecting surface 24 of the housing 10.

Figure 3:
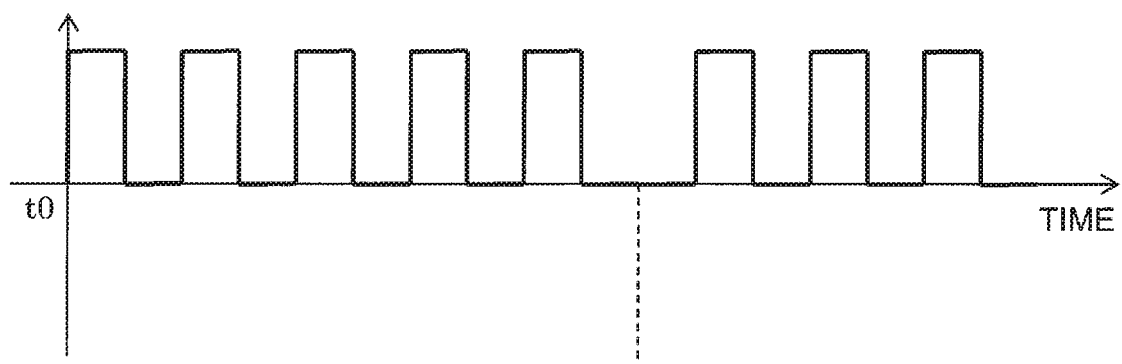
FIG. 3 is a diagram illustrating a transmission pulse signal generated by a transmission circuit.
Figure 3:
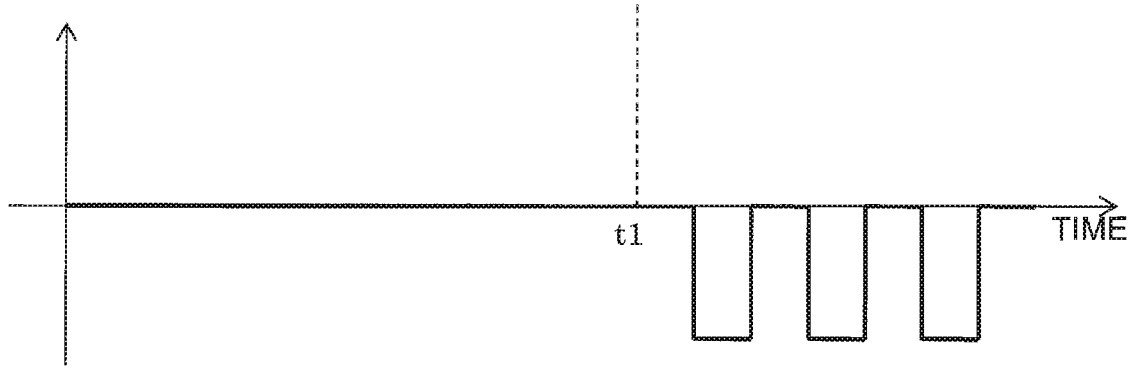

FIG. 3 illustrates a transmission pulse signal generated by the transmission circuit 38 under control of the transmission/reception control unit 30. A horizontal axis indicates time, and a vertical axis indicates amplitude. The transmission pulse signal is a differential signal formed by a pair of a positive signal and a negative signal. An ultrasonic pulse transmitted from the transmission transducer 16 is based on a signal from which a DC component is removed by subtracting the negative signal from the positive signal. A positive signal of a rectangular wave corresponding to five cycles from time t0 is generated, and a rectangular wave having an antiphase is generated as a positive signal over three cycles at time t1 after five cycles from the time t0. A level of a negative signal is 0 from the time t0 to the time t1. Then, a negative signal of a rectangular wave corresponding to three cycles is generated after the time t1. After the time t1, the negative signal has a reverse polarity to the positive signal. According to such a transmission pulse signal, ultrasonic pulses whose amplitude is increased after the amplitude is decreased in a sixth cycle are transmitted from the transmission transducer 16.

Here, the description has been given with respect to the transmission pulse signal in which the positive phase signal of the five cycles is followed by the negative phase signal of the three cycles. The number of cycles of the positive phase signal (the number of repetitions) and the number of cycles of the negative phase signal are arbitrary. Further, the amplitude of the negative phase signal may be equal to the amplitude of the positive phase signal, or may be different from the amplitude of the positive phase signal. In other words, the amplitude of the negative phase signal does not need to be twice the amplitude of the positive phase signal, and may be an arbitrary magnitude. Further, the frequency of the negative phase signal may be different from the frequency of the positive phase signal. Using a signal in which the positive phase signal is followed by the negative phase signal as a transmission pulse signal, the waveform of the ultrasonic pulse received by the reception transducer 18 changes significantly, and accuracy is improved in the processing of specifying the time at which the ultrasonic pulse is received.

As described above, the gas concentration measurement device according to the present embodiment is configured by the ultrasonic transmitter. The ultrasonic transmitter includes transmission units (the transmission circuit 38 and the transmission transducer 16) that transmit first ultrasonic waves generated based on the positive phase signal to the concentration measurement space and transmit second ultrasonic waves generated based on the negative phase signal following the positive phase signal to the concentration measurement space. The second ultrasonic waves have an antiphase with respect to the first ultrasonic waves and an amplitude different from that of the first ultrasonic waves.

The reception transducer 18 and the reception circuit 40 operate as reception units that receive the ultrasonic waves. The reception transducer 18 receives the ultrasonic pulse reflected by the reflecting surface 24 of the housing 10, converts the received ultrasonic pulse into a reception pulse signal that is an electric signal, and outputs the signal to the reception circuit 40. The reception circuit 40 adjusts a level of the reception pulse signal and outputs the signal to the processor 28. The processor 28 stores reception data indicating the reception pulse signal in the storage unit 42. The reception data is data in which the value of the reception pulse signal is associated with time. The propagation time measurement unit 32 formed in the processor 28 obtains, with reference to the reception data stored in the storage unit 42, a propagation time tp until the reception circuit 40 outputs the reception pulse signal after the transmission circuit 38 outputs the transmission pulse signal.

Figure 4:
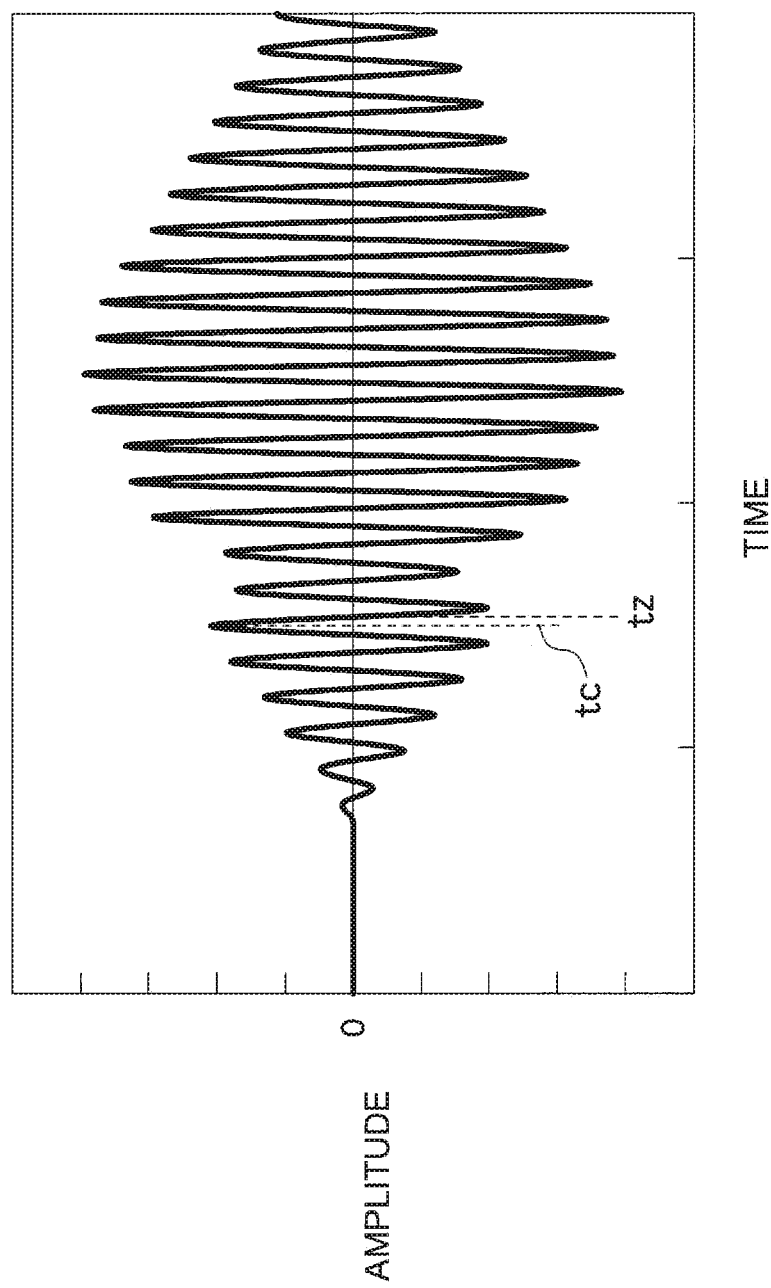
FIG. 4 is a diagram illustrating an example of a reception pulse signal.

FIG. 4 illustrates an example of a reception pulse signal when an ultrasonic transmission pulse is transmitted according to the transmission pulse signal illustrated in FIG. 3. A horizontal axis indicates time, and a vertical axis indicates amplitude. The reception pulse signal has a time waveform in which a plurality of undulations are continuous on a time axis. However, "one undulation" represents the time waveform that increases from a level of 0 to a maximum, then decreases and changes from positive to negative at a zero crossing point, increases in a negative direction to a minimum, and then increases in a positive direction to the next zero crossing point. The zero crossing point is a point on the time waveform where a positive/negative amplitude value of the reception pulse signal becomes 0. In the following description, a maximum value of the one undulation is defined as a peak value.

In the reception pulse signal, the peak value gradually increases from an initial undulation toward a subsequent undulation, the peak value temporarily decreases from a predetermined-numbered undulation, and the peak value gradually increases again toward a subsequent undulation. Then, the peak value gradually decreases from the undulation having the largest peak value toward a subsequent undulation. In the example illustrated in FIG. 4, the peak value increases from an initial undulation to a sixth undulation, the peak value temporarily decreases at a seventh undulation, and the peak value gradually increases again toward a subsequent undulation. FIG. 4 illustrates the reception pulse signal in which a maximum value (a positive peak) appears at first, but a reception pulse signal in which a minimum value (a negative peak) appears at first in some cases.

The propagation time measurement unit 32 illustrated in FIG. 2 refers to the reception data stored in the storage unit 42 and obtains a time at which the ultrasonic pulse is received according to the following process. In other words, the propagation time measurement unit 32 specifies a search point time at which a positive peak immediately before a positive peak corresponding to the minimum point of an upper-limit envelope of the reception pulse signal appears. Here, the upper-limit envelope represents an envelope connecting positive peaks. The propagation time measurement unit 32 obtains a boundary point time tz that is a time of a zero crossing point (boundary point) immediately after the search point time.

The propagation time measurement unit 32 obtains a propagation time tp (tz−t1) by subtracting the time t1 (FIG. 3) at which the phase of the transmission pulse signal changes from the boundary point time tz.

When a plurality of minimum points appear in the upper-limit envelope, the propagation time measurement unit 32 may execute the following process. In other words, the propagation time measurement unit 32 obtains a minimum point depth that is the sum of a descending evaluation value obtained by subtracting the peak value at the minimum point from the peak value at the maximum point of the upper-limit envelope appearing immediately before the minimum point of the upper-limit envelope, and an ascending evaluation value obtained by subtracting the peak value at the minimum point from the peak value at the maximum point of the upper-limit envelope appearing immediately after the minimum point of the upper-limit envelope. The minimum point depth is an evaluation value indicating a depth of a recess where the minimum point of the upper-limit envelope appears. The propagation time measurement unit 32 specifies a search point time tc at which the positive peak appears immediately before the positive peak corresponding to the minimum point having the largest minimum point depth, among the plurality of minimum points, appearing in the upper-limit envelope. Then, the propagation time measurement unit obtains the boundary point time tz that is the time of the zero crossing point immediately after the search point time tc. The propagation time measurement unit 32 obtains the propagation time tp=(tz−t1) by subtracting the time t1 at which the phase of the transmission pulse signal changes from the boundary point time tz.

Figure 5:
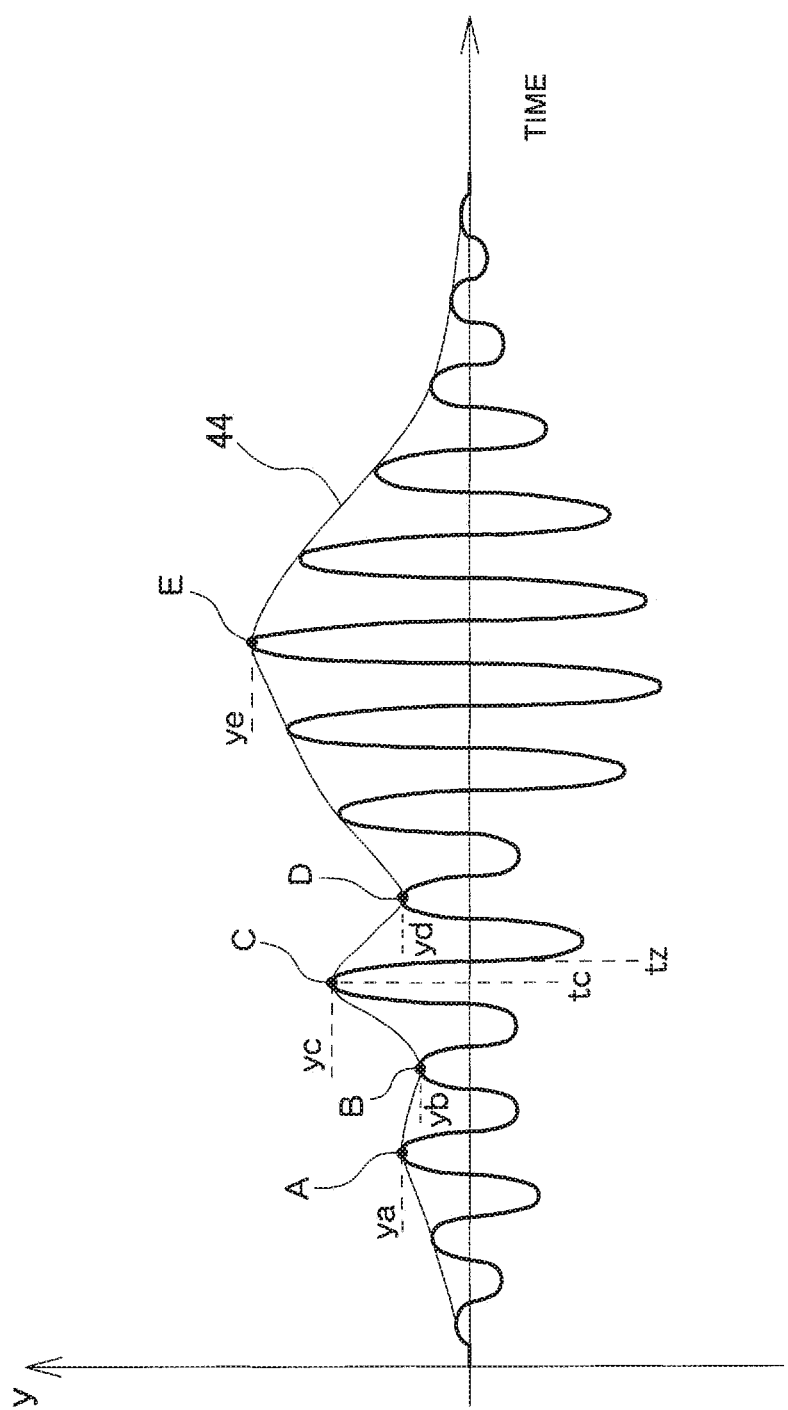
FIG. 5 is a diagram schematically illustrating an example of a reception pulse signal in which a plurality of minimum points appear in an upper-limit envelope.

FIG. 5 schematically illustrates an example of a reception pulse signal in which a plurality of minimum points appear in an upper-limit envelope 44. The upper-limit envelope 44 has two minimum points B and D. A descending evaluation value e1 is obtained by subtracting a peak value yb at a minimum point B from a peak value ya at a maximum point A appearing on the upper-limit envelope 44 immediately before the minimum point B of the upper-limit envelope 44 (e1=ya−yb). In addition, an ascending evaluation value f1 is obtained by subtracting the peak value yb of the minimum point B from a peak value yc at a maximum point C appearing on the upper-limit envelope 44 immediately after the minimum point B of the upper-limit envelope 44 (f1=yc−yb). Accordingly, a minimum point depth db for the minimum point B satisfies a relation of db=e1+f1=(ya−yb)+(yc−yb).

On the other hand, a descending evaluation value e2 is obtained by subtracting a peak value yd at a minimum point D from the peak value yc at the maximum point C appearing on the upper-limit envelope 44 immediately before the minimum point D of the upper-limit envelope 44 (e2=yc−yd). In addition, an ascending evaluation value f2 is obtained by subtracting the peak value yd of the minimum point D from a peak value ye at a maximum point E appearing on the upper-limit envelope 44 immediately after the minimum point D of the upper-limit envelope 44 (f2=ye−yd). Accordingly, a minimum point depth dd for the minimum point D satisfies a relation of dd=e2+f2=(yc−yd)+(ye−yd).

In the reception pulse signal illustrated in FIG. 5, the minimum point depth dd=(yc−yd)+(ye−yd) is larger than the minimum point depth db=(ya−yb)+(yc−yb). Therefore, the propagation time measurement unit 32 specifies the search point time tc at which the positive peak (maximum point C) appears immediately before the positive peak corresponding to the minimum point D. Then, the propagation time measurement unit obtains the boundary point time tz that is the time of the zero crossing point immediately after the search point time tc. The propagation time measurement unit 32 obtains the propagation time tp (tz−t1) by subtracting the time t1 at which the phase of the transmission pulse signal changes from the boundary point time tz.

In this manner, the propagation time measurement unit 32 acquires the reception pulse signal serving as the reception signal output from the reception circuit 40 based on the ultrasonic pulse received by the reception transducer 18, detects the boundary point formed on the time waveform of the reception pulse signal depending on the components of the first ultrasonic waves contained in the received ultrasonic pulse and the components of the second ultrasonic waves contained in the received ultrasonic pulse, and obtains the propagation time tp required for the ultrasonic waves to propagate in the concentration measurement space based on the time at which the transmission pulse signal is transmitted and the time of the boundary point.

In other words, the gas concentration measurement device is configured by the propagation time device that transmits the ultrasonic waves to the concentration measurement space and obtains the time required for the ultrasonic waves to propagate in the concentration measurement space based on the time at which the ultrasonic waves are transmitted and the time at which the ultrasonic waves propagating in the concentration measurement space are received.

In the above-described embodiment, the description has been given with respect to the process of obtaining the propagation time tp using the positive peaks and the upper-limit envelope of the reception pulse signal. The propagation time measurement unit 32 may obtain the propagation time tp using the negative peaks and the lower-limit envelope of the reception pulse signal. Here, the lower-limit envelope represents an envelope connecting the negative peaks. In this case, the propagation time measurement unit 32 specifies the search point time td at which a negative peak immediately before a negative peak corresponding to a maximum point of a lower-limit envelope of the reception pulse signal appears. The propagation time measurement unit 32 obtains a boundary point time tz that is a time of a zero crossing point (boundary point) immediately before the search point time td.

In addition, when a plurality of maximum points appear in the lower-limit envelope, the propagation time measurement unit 32 may execute the following process. In other words, the propagation time measurement unit 32 obtains a maximum point depth that is the sum of an ascending evaluation value obtained by subtracting the negative peak value at the maximum point from the peak value at the minimum point of the lower-limit envelope appearing immediately before the maximum point of the lower-limit envelope, and a descending evaluation value obtained by subtracting the negative peak value at the maximum point from the negative peak value at the minimum point of the lower-limit envelope appearing immediately after the maximum point of the lower-limit envelope. The maximum point depth is an evaluation value indicating a depth of a recess where the maximum point of the lower-limit envelope appears. The propagation time measurement unit 32 specifies a search point time td at which the negative peak immediately before the negative peak corresponding to the maximum point having the largest maximum point depth, among the plurality of maximum points appearing in the lower-limit envelope, appears. Then, the propagation time measurement unit obtains the boundary point time tz that is the time of the zero crossing point immediately before the search point time td. The propagation time measurement unit 32 obtains the propagation time tp=(tz−t1) by subtracting the time t1 at which the phase of the transmission pulse signal changes from the boundary point time tz.

Returning to FIG. 2, the measurement of the hydrogen concentration will be described. The storage unit 42 stores a propagation distance d0. The propagation distance d0 is a value obtained by measuring in advance the distance of the section where the ultrasonic waves reach the reflecting surface 24 of the housing 10 from the transmission transducer 16 and reach the reception transducer 18 from the reflecting surface 24. The concentration measurement unit 36 reads the propagation distance d0 from the storage unit 42, and divides the propagation distance d0 by the propagation time tp to obtain a propagation speed measurement value vm (=d0/tp). In addition, the concentration measurement unit 36 obtains a temperature measurement value Tm based on the value detected by the temperature sensor 26. The concentration measurement unit 36 obtains a hydrogen concentration p based on the following equation (Equation 1).

$$p = \frac{1}{M_h - M_a}(kRT_m/v_m^2 - M_a) \quad \text{[Equation 1]}$$

Here, k represents a specific heat ratio of a gas, R represents a gas constant, Mh represents a molecular weight of hydrogen, and Ma represents a molecular weight of air that does not contain hydrogen. Assuming that the composition of air to be measured consists only of 80% nitrogen and 20% oxygen, the specific heat ratio k may be 1.4. Further, the gas constant R is 8.31, the molecular weight Mh of hydrogen is 2.0, and the molecular weight Ma of air is 28.8. As described above, the propagation speed measurement value vm and the temperature measurement value Tm are obtained by the concentration measurement unit 36.

Since each value on the right side of Equation 1 is known, the concentration measurement unit 36 can obtain the hydrogen concentration p from Equation 1. The processor 28 outputs the obtained hydrogen concentration p from the connector 22 to an external computer. When the gas concentration measurement device includes a display panel, the processor 28 may display the hydrogen concentration p on the display panel.

As described above, the gas concentration measurement device according to the present embodiment is configured by the ultrasonic transmitter. The ultrasonic transmitter includes transmission units (the transmission circuit and the transmission transducer 16) that transmit first ultrasonic waves generated based on the positive phase signal to the concentration measurement space, and transmit second ultrasonic waves generated based on the negative phase signal following the positive phase signal to the concentration measurement space. The second ultrasonic waves following the first ultrasonic waves have an antiphase with respect to the first ultrasonic waves. Thus, the minimum points appear in the upper-limit envelope of the reception pulse signal output from the reception circuit 40. Further, since the second ultrasonic waves following the first ultrasonic waves have an amplitude different from the amplitude of the first ultrasonic waves, these minimum points appear remarkably. Accordingly, it is possible to perform the process of detecting the minimum point of the upper-limit envelope, specifying the search point time tc at which the positive peak immediately before the positive peak corresponding to the minimum point appears, and obtaining the boundary point time tz that is the time of the zero crossing point immediately after the search point time tc. The process is easier than a process of specifying the time at which an ultrasonic pulse with no significant change in the envelope is received. Therefore, the boundary point time tz is measured with high accuracy, and the propagation time tp, the propagation speed vm, and the hydrogen concentration p are measured with high accuracy.

In addition, when the first ultrasonic waves are transmitted to the concentration measurement space and the second ultrasonic waves temporally following the first ultrasonic waves and having an antiphase are transmitted to the concentration measurement space, it has been confirmed that fluctuations in measurement conditions such as gas density and temperature have little effect on the boundary point time tz. Therefore, according to the gas concentration measurement device of the present embodiment, measurement errors due to changes in measurement conditions are reduced.

In the above-described embodiment, the description has been given with respect to the configuration in which the transmission transducer 16 and the reception transducer 18 are separately provided. These ultrasonic transducers may be combined. In other words, a configuration in which one common ultrasonic transducer is connected to the transmission circuit 38 and the reception circuit 40 may be employed, and the ultrasonic transducer may transmit and receive an ultrasonic pulse.

Figure 6:
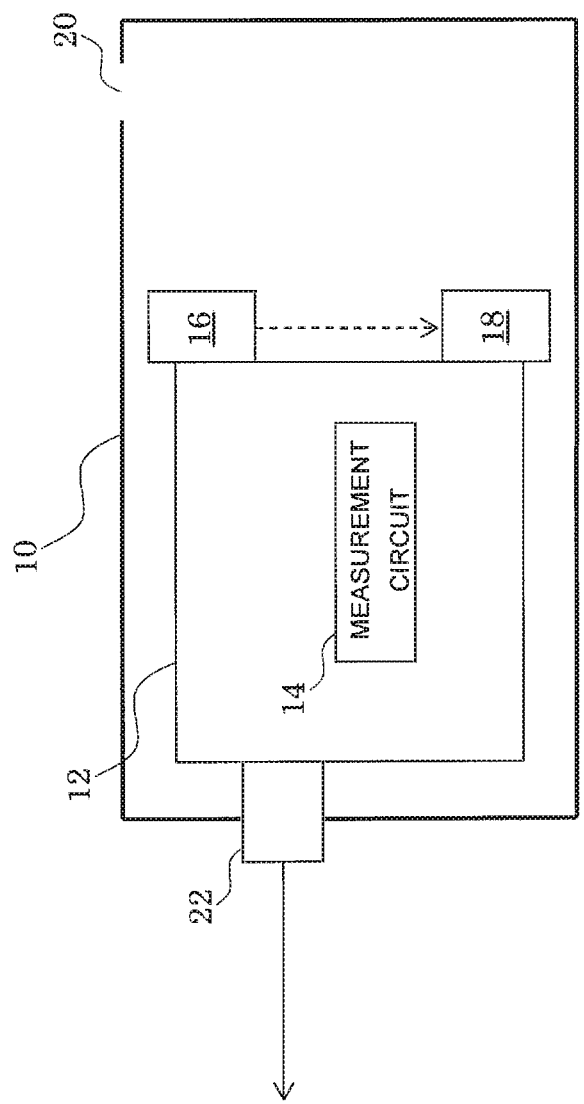
FIG. 6 is a diagram illustrating a modification of a gas concentration measurement device.

In the above-described embodiment, the description has been given with respect to the structure in which the ultrasonic waves are transmitted from the transmission transducer 16 to the reflecting surface 24 of the housing 10 and the ultrasonic waves reflected by the reflecting surface 24 of the housing 10 are received by the reception transducer 18. In addition to such a structure, as illustrated in FIG. 6, a structure may be employed in which the transmission transducer 16 and the reception transducer 18 face each other. In this case, the ultrasonic waves transmitted from the transmission transducer 16 and propagating in the housing 10 are directly received by the reception transducer 18. The distance of a route directly connecting the transmission transducer 16 and the reception transducer 18 is the propagation distance.

In the above-described embodiment, the description has been given with respect to the gas concentration measurement device for measuring the hydrogen concentration.

The gas concentration measurement device may be used to measure a concentration of other gases. In this case, processing is executed in a state where the specific heat ratio k, the number of molecules, and the like in Equation 1 are replaced with values of the gas to be measured.

REFERENCE SIGNS LIST

10 housing
12 circuit board
14 measurement circuit
16 transmission transducer
18 reception transducer
20 vent hole
22 connector
24 reflecting surface
26 temperature sensor
28 processor
30 transmission/reception control unit
32 propagation time measurement unit
36 concentration measurement unit
38 transmission circuit
40 reception circuit
42 storage unit
44 upper-limit envelope

The invention claimed is:

1. An ultrasonic transmitter mounted on a propagation time measurement device,
the propagation time measurement device being a device that transmits ultrasonic waves to a measurement space, and obtains a time required for the ultrasonic waves to propagate in the measurement space based on a time at which the ultrasonic waves are transmitted and a time at which the ultrasonic waves propagating in the measurement space are received,
the ultrasonic transmitter comprising:
a transmission unit that transmits first ultrasonic waves to the measurement space and transmits second ultrasonic waves temporally following the first ultrasonic waves to the measurement space, wherein
the second ultrasonic waves have an antiphase with respect to the first ultrasonic waves and
the propagation time measurement device is configured to determine a gas concentration based at least on an analysis of the first and second ultrasonic waves and a temperature.

2. The ultrasonic transmitter according to claim 1, wherein the second ultrasonic waves have an amplitude larger than an amplitude of the first ultrasonic waves.

3. The ultrasonic transmitter according to claim 1, wherein
the propagation time measurement device detects a boundary point formed on a time waveform of a reception signal using components of the first ultrasonic waves contained in the reception signal based on the received ultrasonic waves and components of the second ultrasonic waves contained in the reception signal, and obtains the time required for the ultrasonic waves to propagate in the measurement space based on a timing of the boundary point, and
the propagation time measurement device identifies:
a search point time at which a positive peak immediately before a positive peak corresponding to a minimum point of an upper-limit envelope of the reception signal appears, or
a search point time at which a positive peak immediately before a positive peak corresponding to a minimum point having a largest minimum point depth among a plurality of minimum points in the upper-limit envelope of the reception signal appears, or
a search point time at which a negative peak immediately before a negative peak corresponding to a maximum point of a lower-limit envelope of the reception signal appears, or
a search point time at which a negative peak immediately before a negative peak corresponding to a maximum point having a largest maximum point depth among a plurality of maximum points in the lower-limit envelope of the reception signal appears, and
the propagation time measurement device detects, as the boundary point, a zero-crossing point immediately after the identified search point time.

4. A propagation time measurement device, comprising:
a transmission unit that transmits first ultrasonic waves to a measurement space and transmits second ultrasonic waves temporally following the first ultrasonic waves to the measurement space;
a reception unit that receives ultrasonic waves propagating in the measurement space;
a propagation time measurement unit that obtains a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit, wherein
the second ultrasonic waves have an antiphase with respect to the first ultrasonic waves; and
a measurement circuit configured to determine a concentration of a specific gas based at least on an analysis of the irst and second ultrasonic waves and a temperature.

5. The propagation time measurement device according to claim 4, wherein the second ultrasonic waves have an amplitude larger than an amplitude of the first ultrasonic waves.

6. The propagation time measurement device according to claim 4, wherein the propagation time measurement unit acquires a reception signal output from the reception unit based on the ultrasonic waves received by the reception unit, detects a boundary point formed on a time waveform of the reception signal depending on components of the first ultrasonic waves contained in the reception signal and components of the second ultrasonic waves contained in the reception signal, and obtains the time required for the ultrasonic waves to propagate in the measurement space based on a time of the boundary point.

7. The propagation time measurement device according to claim 6, wherein
the propagation time measurement device further identifies:
a search point time at which a positive peak immediately before a positive peak corresponding to a minimum point of an upper-limit envelope of the reception signal appears, or a search point time at which a positive peak immediately before a positive peak corresponding to a minimum point having a largest minimum point depth among a plurality of minimum points in the upper-limit envelope of the reception signal appears, or a search point time at which a negative peak immediately before a negative peak corresponding to a maximum point of a lower-limit envelope of the reception signal appears, or a search point time at which a negative peak immediately before a negative peak corresponding to a maximum point having a largest maximum point depth among a plurality of maximum points in the lower-limit envelope of the reception signal appears, and the propagation time measurement device detects, as the boundary point, a zero-crossing point immediately after the identified search point time.

8. A gas concentration measurement device, comprising:
the propagation time measurement device according to claim 4; and
a concentration measurement unit that measures the concentration of the specific gas in the measurement space based on the time required for the ultrasonic waves to propagate in the measurement space.

9. A propagation time measurement program to be read by a propagation time measurement instrument,
the propagation time measurement instrument including:
a transmission unit that transmits ultrasonic waves to a measurement space;
a reception unit that receives ultrasonic waves propagating in the measurement space; and
a propagation time measurement unit that controls the transmission unit to transmit the ultrasonic waves to the transmission unit, and obtains a time required for the ultrasonic waves to propagate in the measurement space based on a time at which the ultrasonic waves are transmitted from the transmission unit and a time at which the ultrasonic waves are received by the reception unit,
the propagation time measurement program causing propagation time measurement instrument to execute steps of:
causing the transmission unit to execute a transmission process of transmitting first ultrasonic waves to a measurement space and transmitting second ultrasonic waves temporally following the first ultrasonic waves to the measurement space, the second ultrasonic waves having an antiphase with respect to the first ultrasonic waves;
obtaining a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit; and
determining a concentration of a specific gas based at lieacst on an analysis of the first and second ultrasonic waves and a temperature.

10. The propagation time measurement program according to claim 9, wherein the step of obtaining the time required for the ultrasonic waves to propagate in the measurement space includes a step of:

acquiring a reception signal output from the reception unit based on the ultrasonic waves received by the reception unit, detecting a boundary point formed on a time waveform of the reception signal depending on components of the first ultrasonic waves contained in the reception signal and components of the second ultrasonic waves contained in the reception signal, and obtaining the time required for the ultrasonic waves to propagate in the measurement space based on a time of the boundary point.

11. A propagation time measurement method to be executed by a propagation time measurement instrument,
the propagation time measurement instrument including:
a transmission unit that transmits ultrasonic waves to a measurement space;
a reception unit that receives ultrasonic waves propagating in the measurement space; and
a propagation time measurement unit that controls the transmission unit to transmit the ultrasonic waves to the transmission unit, and obtains a time required for the ultrasonic waves to propagate in the measurement space based on a time at which the ultrasonic waves are transmitted from the transmission unit and a time at which the ultrasonic waves are received by the reception unit,
the propagation time measurement method, comprising:
causing the transmission unit to execute a transmission process of transmitting first ultrasonic waves to a measurement space and transmitting second ultrasonic waves temporally following the first ultrasonic waves to the measurement space, the second ultrasonic waves having an antiphase with respect to the first ultrasonic waves;
obtaining, using the propagation time measurement instrument, a time required for the ultrasonic waves to propagate in the measurement space based on a time at which the first ultrasonic waves and the second ultrasonic waves are transmitted from the transmission unit and a time at which the first ultrasonic waves and the second ultrasonic waves are received by the reception unit; and
determining a concentration of a specific gas based at least on an analysis of the first and second ultrasonic waves and a temperature.

12. The propagation time measurement method according to claim 11, wherein the obtaining the time required for the ultrasonic waves to propagate in the measurement space includes:
acquiring a reception signal output from the reception unit based on the ultrasonic waves received by the reception unit, detecting a boundary point formed on a time waveform of the reception signal depending on components of the first ultrasonic waves contained in the reception signal and components of the second ultrasonic waves contained in the reception signal, and obtaining the time required for the ultrasonic waves to propagate in the measurement space based on a time of the boundary point.

13. A gas concentration measurement system comprising:
a housing with a vent;
a measurement circuit, the measurement circuit including:
a processor with a propagation time measurement function and a gas concentration measurement function; and
a temperature sensor configured to sense a temperature;
a transmission circuit coupled to a transmission transducer;

a reception circuit coupled to a reception transducer;
wherein:
the transmission circuit transmits first ultrasonic waves into the housing and transmits second ultrasonic waves temporally following the first ultrasonic waves into the housing,
the reception circuit receives ultrasonic waves propagating in the measurement space,
the processor obtains a time required for the ultrasonic waves to propagate in the housing based on a time at which the first ultrasonic waves and the second ultrasonic waves are transmitted from the transmission transducer and a time at which the first ultrasonic waves and the second ultrasonic waves are received by the reception transducer,
the second ultrasonic waves are in antiphase with respect to the first ultrasonic waves; and
the measurement circuit is configured to determine a concentration of a specific gas in the housing based at least on an analysis of the first and second ultrasonic waves and the temperature.

* * * * *